United States Patent [19]

Schult et al.

[11] Patent Number: 4,928,531
[45] Date of Patent: May 29, 1990

[54] FASTENING DEVICE FOR THE ATTACHING OF AN ELECTRIC TRANSMITTER

[75] Inventors: Klaus Schult, Frankfurt am Main; Horst Kister, Wehrheim, Fed. Rep. of Germany; Michael Quenzer, Frankfurt am Main, all of Fed. Rep. of Germany

[73] Assignee: VDO Adolf Schindling AG, Frankfurt am Main, Fed. Rep. of Germany

[21] Appl. No.: 179,720

[22] Filed: Apr. 11, 1988

[30] Foreign Application Priority Data

Apr. 11, 1987 [DE] Fed. Rep. of Germany ....... 3712424

[51] Int. Cl.⁵ .............................................. G01L 1/00
[52] U.S. Cl. ...................................... 73/855; 73/802; 73/866.5; 411/384
[58] Field of Search ...................... 73/866.5, 802, 855; 244/100 R; 411/384

[56] References Cited

U.S. PATENT DOCUMENTS

| | | | |
|---|---|---|---|
| 2,183,078 | 12/1939 | Kemler | 73/855 X |
| 2,285,580 | 6/1942 | Hanson | 73/855 |
| 3,028,754 | 4/1962 | Huyser | 73/855 X |
| 3,419,298 | 12/1968 | Worley | 411/384 X |
| 3,563,131 | 2/1971 | Ridey, Sr. | 411/384 |
| 3,797,302 | 3/1974 | Laimins | 73/855 X |
| 3,910,106 | 10/1975 | Brady | 73/855 X |
| 4,108,407 | 8/1978 | Cosle et al. | 411/384 X |
| 4,269,070 | 5/1981 | Nelson et al. | 73/779 |
| 4,327,591 | 5/1982 | Dybel et al. | 73/855 |
| 4,367,650 | 1/1983 | Hilgner et al. | 73/866.5 X |
| 4,718,282 | 1/1988 | Bonfils | 73/855 |
| 4,782,706 | 11/1988 | Kister et al. | 73/855 X |

FOREIGN PATENT DOCUMENTS

215945 9/1986 Japan .................................. 73/855

*Primary Examiner*—Tom P. Noland
*Attorney, Agent, or Firm*—Martin A. Farber

[57] ABSTRACT

By the fastening device, two electric transmitters are to be arranged on a supporting structural part from which two extensions (11) protrude spaced from each other. For this purpose, one bored attachment end (15, 16) each of the two transmitters are arranged each on one side (13, 14) of one of the two extensions (11) on a threaded bolt (1, 2). The threaded bolt is screwed, with one collar (5, 6) each lying on both sides against the extension (11), directly to the latter. The attachment ends each have such a large recess (20 22) that they rest only on the extension without resting on the collars (5, 6). The threaded bolt (1, 2) is provided on the outside on both ends with a threaded section (9, 10). Nuts (25, 26) which are screwed on the respective threaded sections press in each case one of the two attachment ends (15, 16) against the extension (11).

8 Claims, 2 Drawing Sheets

FASTENING DEVICE FOR THE ATTACHING OF AN ELECTRIC TRANSMITTER

FIELD AND BACKGROUND OF THE INVENTION

The present invention relates to a fastening device for the attaching of an electric transmitter in general.

In particular, it relates to a fastening device for attaching an electric transmitter, in particular a shear-stress transmitter, on a supporting structural part, particularly an aircraft landing gear, from which two extensions, each provided with a hole passing through it, extend at a distance from each other, each of said extensions being bolted to at least one attachment end of the transmitter provided with a hole by a threaded bolt which extends through the extension into the attachment end, and at least one nut, the attachment end lying against one side of the extension.

Such fastening devices are provided on one supporting structural part each of an aircraft landing gear for the application of an electric transmitter, in particular an inductive shear-stress transmitter, so that the transmitter gives off an electric signal corresponding to the deformation of the structural part under the load of the aircraft, it being possible to use the signal to calculate the load and the position of the center of gravity of the aircraft. A knowledge of the load and of the center of gravity is imparted in order to satisfy prescribed limit values and optimize operating variables of the aircraft, particularly velocity variables.

Up to now a fastening device of the aforementioned kind was used only for attaching a single electric transmitter between the two extensions on the supporting structural part both of which were provided with a passage hole (U.S. Pat. No. 4,269,070). A flat mounting surface of the attachment provided with hole lies in each case completely—with the exception of the hole passing through them—against a similarly flat surface of the corresponding extension. With the hole which passes through the attachment end there is aligned a passage bore in the associated extension. Each attachment end is fastened by a cap bolt whose threaded shank extends through the hole in the attachment end and the passage hole in the extension, a torque nut and a lock nut being threaded onto a threaded section of the bolt which extends out of the extension. In this way the attachment end of the transmitter is pressed between the cap of the nut and these two bolts against the flat mounting surface of the extension.

If, however, in order to satisfy modern safety requirements, two transmitters arranged in parallel to each other or their attachment ends are attachment to each extension by this known cap nut, it is not possible to loosen and replace only one of the two transmitters in case of need without, after the replacement and the renewed attachment, also recalibrating the transmitter remaining on the extension or newly applied to it. This last-mentioned transmitter is in fact necessarily also loosened upon the loosening of the cap bolt. This is true regardless of whether the attachment ends of the two transmitters are brought to rest on the same side or on different sides of the corresponding extension.

There has furthermore been proposed a holding device for the holding of two electrical transmitters, in particular shear-stress transmitters, within a tubular structural part, particularly an aircraft axle, which comprises two radially resilient holding rings which are developed with a smaller outside diameter than the inside diameter of the tubular structural part. The holding rings have radially protruding holding extensions which can rest under resilient initial stress against the inner wall of the tubular structural part. Towards the inside there extend out of each of the holding rings, in particular diametrically opposite each other, two support parts, on each of which a support element of a shear-stress transmitter can be fastened. For this purpose, a fastening bolt which extends through a hole in the support element is threaded into a threaded hole in the support part. It is not possible to bolt more than one support element for a shear-stress transmitter on one support part. Rather, for the application of each shear-stress transmitter a separate support part is provided in each of the two holding rings which are arranged spaced apart in the tubular structural part in such a manner that the shear-stress transmitters are arranged in the tubular structural part at diametrically opposite places.

SUMMARY OF THE INVENTION

It is an object of the present invention to develop a fastening device of the aforementioned kind in which the transmitters are adapted to be fastened on two extensions, each provided with a passage opening, which protrude at a distance from each other from a supporting structural part, in such a manner that two transmitters can be so arranged on these two extensions that each transmitter individually can be detached from the extensions and if necessary replaced without affecting the other transmitter. In this way, recalibration of the transmitter which remains on the extensions can be dispensed with. Despite uncomplicated construction, a high precision in measurement is assured.

Accordingly, by the invention, for the attaching of each attachment end provided with hole (15, 16) of two transmitters on one side (13, 14) each, one of the two extensions (11) of the threaded bolts (stud bolts 1, 2) is bolted in each case to an element (collar 5, 6) of widened diameter on both sides directly to the latter; each of the attachment ends has such a large recess (20, 22) that they rest, without resting on the elements of widened diameter, only against the extension; the threaded bolt has on both sides on the outside a threaded section (9, 10) and at least one nut (25, 26) which is screwed on each threaded section presses in each case one of the two attachment ends (15, 16) against the extension (11).

The principle of the solution is based on the fact that the attachment of the threaded bolt to the extension in question is separate from the attachment of the two attachment ends of the transmitters to said extension and that furthermore the two transmitters are spaced from each other by the extension. In this way a replacement of each sensor is possible without affecting the flow of force between the attachment end of the other sensor and the extension. Therefore, each of the two transmitters can be replaced in simple manner without loosening and without it being subsequently necessary to calibrate the other transmitter. The threaded bolt which serves for the attachment of the two attachment ends to an extension is not developed as a cap screw but with a threaded section on each of its two outer ends. The threaded bolt furthermore has elements having a diameter which is larger than it and between which a middle section of the threaded bolt which lies in the passage hole of the extension is firmly clamped. The attachment ends of the transmitters, on their part, have such large recesses on the side of their mounting surfaces that the elements of widened diameter of the threaded bolt do not rest on them but exclusively on the extension. In that way the uncoupling of the attachment of the threaded bolt on the extension from the application of the attachment ends on the same extension is assured.

A first variation of the fastening device according to the principle described above is indicated wherein the threaded bolt is developed as a bipartite stud bolt (1, 2) whose two parts each have a collar (5, 6) and can be screwed into each other in such a manner, with the inclusion of the extension (11), that the collars are pressed on both sides against the extension.

One advantage of this first variation is that the two outer ends of the two stay-bolt parts which extend outward from the corresponding collar can be developed identically, i.e. the thread need not extend at any outer end up to the collar since the collar of the corresponding stay-bolt part can form a fixed unit with it and need not be screwed onto it. Preferably, the collars have nut-shaped flattenings so that the two parts of the stay bolt can be screwed into one another with inclusion of the extension in simple manner by the use of wrenches and thus clamped in the extension.

The features of a second variation of the fastening device, which is also constructed in accordance with the principle described, consist therein that the threaded bolt is developed as a continuous stay bolt (27) and at different distances from its two ends has a fixed, nut-like collar (32), and that the threaded section (28) at the end of the threaded bolt remote from the collar (32) extends to so close to the collar that the extension is clamped between a collar nut (33) threaded onto said threaded section and the collar.

With this variation, the threaded bolt consists of one piece and is developed asymmetrically with respect to its center. A nut-shaped collar forms a fixed unit with the threaded bolt and comes to rest against one side of the extension upon the attachment of the threaded bolt, while a collar nut is screwed on the other end of the threaded bolt until it comes against the extension. For this purpose, the threaded section on the corresponding end of the threaded bolt extends at least up to the extension.

The nuts (25, 26) which press the attachment ends (15, 16) against the extension (11, 30) advantageously have a larger width across flats than the collars (5, 6; 32) or the collar nut (33).

In this way assurance is had that, in the event of symmetrical development of each attachment end, i.e. with recesses of the same size on the two sides of the attachment end, this attachment end can be fastened in uncomplicated manner on the extension and the threaded bolt extending through it since it is immaterial with which one of its two sides the attachment end is pushed onto the threaded bolts.

For the well-defined resting on the extension, an extension is developed on at least one but preferably both sides of the attachment ends.

Further according to the invention, disk extensions (23, 24) for the well-defined resting on the extension (11, 30) are developed from the attachment ends (16) of the transmitters.

Further features make possible a simple mounting of the attachment end, its centering around the threaded bolt and its well-defined resting on the extension.

In this respect, according to one feature, the recesses (19, 20; 21, 22) in the attachment ends (15, 16) represent in each case a stepped coaxial widening to a passage hole (17, 18).

According to another feature of the invention, the recesses (19, 20, 21, 22) are developed from an attachment end on both sides of the passage hole (17, 18).

BRIEF DESCRIPTION OF THE DRAWINGS

With the above and other objects and advantages in view, the present invention will become more clearly understood in connection with the detailed description of preferred embodiments, when considered with the accompanying drawings, of which.

In both figures, the fastening devices are shown on an enlarged scale.

DETAILED DESCRIPTION OF THE PREFERRED EMBODIMENTS

Figure 1:
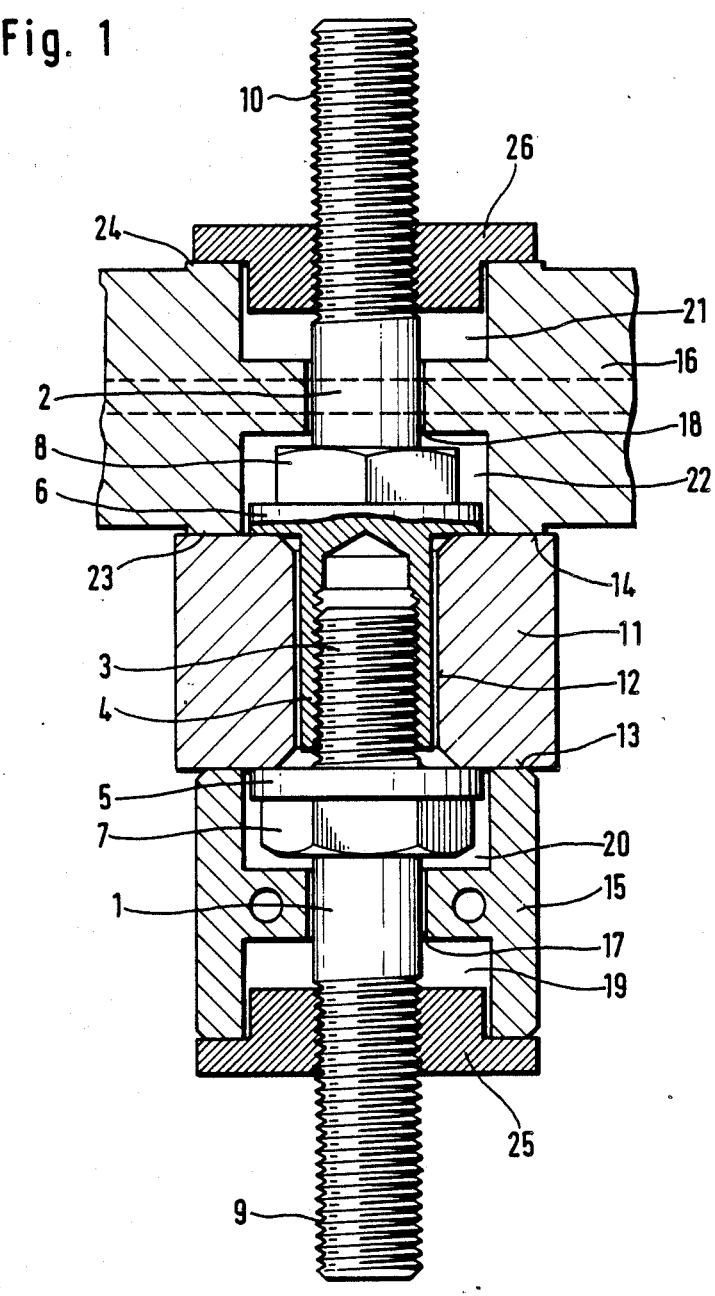
FIG. 1 is a longitudinal section through the fastening device with a two-part stay bolt.

In FIG. 1 the two stay-bolt parts are designated 1 and 2. The stay-bolt part 1 has a short threaded end 3 which can be screwed into an internally threaded sleeve-like end 4 of the threaded-bolt part 2. The threaded end and the sleeve-shaped end of each stay-bolt part are limited by collars 5 and 6 respectively which have nut-shaped flats 7, 8 for the engagement of a wrench. At their outer ends both stay-bolt parts are provided with threads 9 and 10 which, however, do not extend up to the collars 5, 6 or their nut-shaped flats.

For mounting on an extension 11 which protrudes from a supporting part (not shown) of an aircraft landing gear, the two stay-bolt parts are introduced from two opposite sides into a continuous hole 12 in the extension and screwed together until the insides of the collars 5 and 6 rest firmly against flat mounting sides 13, 14 of the extension.

The extension with the stay-bolt part fastened to it is now prepared to receive one attachment end 15, 16 each on each mounting side of the extension. It will be noted that the attachment 15 is shown turned 90° with respect to the attachment 16 while in actual feet the attachments are mounted parallel to each other.

Each attachment end has on both sides a continuous hole 17 and 18 respectively and symmetrically thereto the cylindrical recesses 19, 20 and 21, 22 respectively. The recess 20, 22 is so large that the attachment end 15, 16 cannot rest on the collar 5, 6 or the nut-shaped flat 7, 8 thereof but exclusively on the flat mounting side 13, 14 respectively of the extension 11. For the well-defined resting on this mounting surface there is developed from each attachment end a disk extension which is designated 23 and 24 respectively on the attachment end 16.

Each attachment end 15 and 16 respectively can be arranged independently of the other one on each side of the extension 11 by pushing it over the corresponding stay-bolt part 1 or 2 respectively and screwing a nut 25, 26 respectively onto the thread 9 or 10 respectively. Each nut has a narrowed part which extends into one of the recesses 19 or 21 respectively and an outer widened part which rests on the attachment end or disk extension 24.

After the tightening of the nuts 25, 26 each attachment end is arranged independently from the other on the extension 11. In this case there is a flow of force between the nut 25 and the collar 6 of the second stay-bolt part by which the attachment end 15 is pressed against the extension, while the attachment end 16 is pressed by a flow of force independent therefrom between the nut 26 and the collar 5 on the first attachment end against the mounting side 23 of the extension 11. It follows from this that, in each case, one of the two attachment ends can be detached from the extension without affecting the other attachment end. The stay bolt remains screwed fast to the extension.

Figure 2:
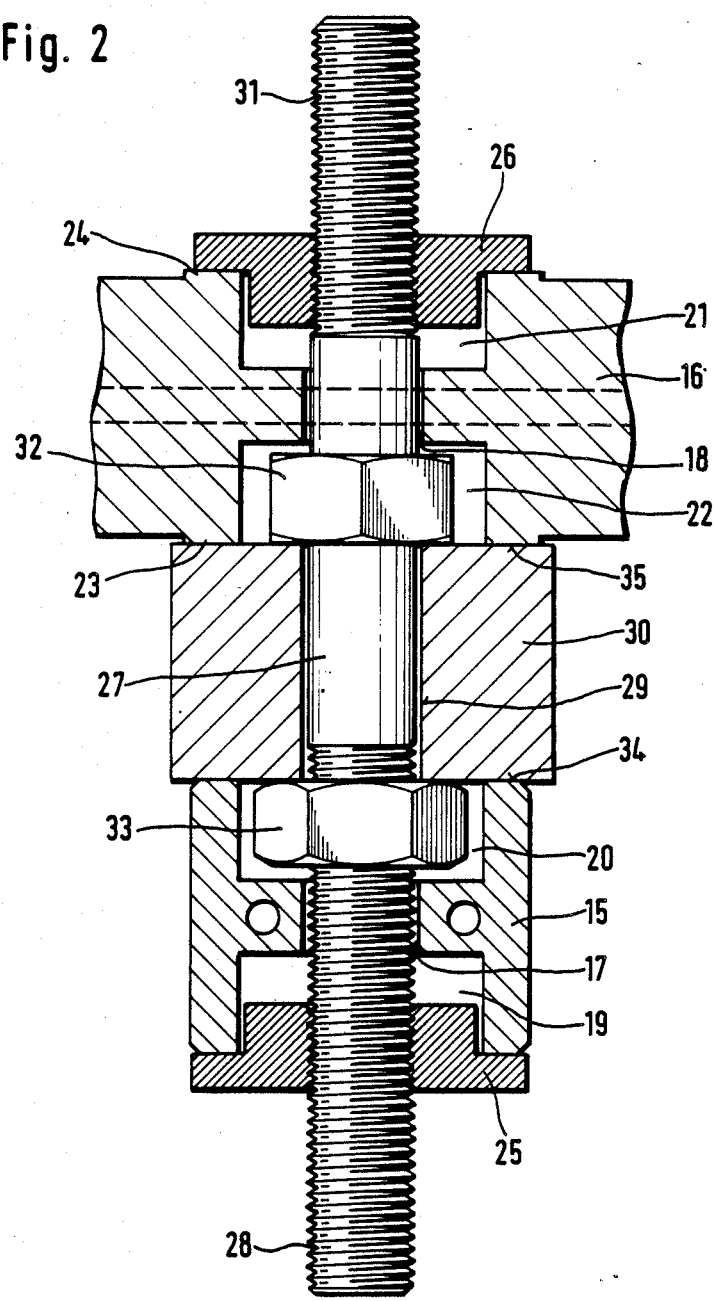
FIG. 2 is an fastening device with a continuous stay bolt.

In the embodiment shown in FIG. 2, the stay bolt 27 is developed continuous. The part of the stay bolt shown at the bottom in the drawing has a thread 28 which extends at least to a passage opening 29 in the extension 30. The upper part of the stay bolt 27 in the drawing, on the other hand, similar to the stay-bolt part 2 in FIG. 1, has only a relatively short thread 31. The upper part is also developed with its fixed nut-shaped collar 32 similar to the stay-bolt part 2 in FIG. 1.

The attachment ends 15 and 16 as well as the nuts 25 and 26 are developed in the same way as in the first embodiment and therefore have been provided with the same reference numbers.

For mounting, the continuous stay bolt is first of all inserted from above, as seen in the drawing, through the passage bore 29 and fastened to the extension 30 in the manner that a collar nut 33 is screwed onto the thread 28 until this collar nut 33 and the nut-shaped collar 32 are pressed against opposite mounting surfaces 34 and 35 of the extension 30.

Then one or both of the attachment ends 15 and 16 can be mounted by pushing them onto the protruding ends of the stay bolt and pressing them by means of the nuts 25 and 26 against the mounting surfaces 34 and 35 respectively, and, in fact, as a result of the recesses 20 and 22 in the attachment ends, exclusively against these mounting surfaces. In this case also, therefore, there is no nut or other attachment element in force-locked connection between the extension and the attachment end of the transmitter any more than in the first embodiment. FIG. 1 shows in phantom view, also applicable to FIG. 2, connection between the fastening device of the invention and the aircraft landing gear, and also to transducers (electric transmitters) for transmitting shear-stress, or strain deflection of an aircraft landing gear. The extension 11 extends from the landing gear. The attachment ends 15 and 16 extend from the transducers.

We claim:

1. In a fastening device for the attaching of an electrical shear-stress transmitter to a supporting structural part of an aircraft landing gear; and wherein the structural part has two extensions spaced apart from each other, each extension having a hole passing through it, said transmitter having an attachment end with a hole therein, there being plural threaded bolts with at least one nut engageable with each bolt, each of said extensions being bolted to at least one attachment end of the transmitter by a threaded bolt which extends through the extension into the attachment end, and at least one nut for engagement with a threaded bolt, the attachment end lying against one side of the extension; the improvement wherein two of said transmitter are attached on opposite sides of each said extension, said device having plural bolt assemblies each of which incorporates the threaded structure of at least one of said bolts and one of said nuts; and wherein each said bolt assembly comprises a first collar means and a second collar means for engagement with opposite sides of one of said extensions, each said bolt assembly including bolt means passing through a hole of said one extension for urging said first and said second collar means against opposite sides of said one extension for securing thereto said bolt means, said bolt means extending outwardly of each said collar means for receipt of attachment ends of said two transmitters on opposed termini of said bolt means; and wherein said bolt means is bolted to each said collar means, each said collar means being of widened diameter on both sides of a shank of the bolt means;

each of the attachment ends has a recess large enough to envelope a collar means to permit resting on an extension, without resting on the collar means; and the bolt means has on each terminus a threaded section for engagement with at least one nut which is screwed on each threaded section, each nut pressing one of the two attachment ends against an extension.

2. A fastening device according to claim 1, wherein said collar means comprises two collars and said bolt means comprises a bipartite stud bolt having two bolt sections each supporting one of said collars, and wherein one bolt section can be screwed into the other bolt section to press the collars against the extension.

3. A fastening device according to claim 2, wherein the collars have nut-shaped flattenings.

4. A fastening device according to claim 1, wherein said bolt means comprises a single continuous stay bolt having two opposed ends;

said collar means comprises a fixed nut-like collar and an adjustable collar nut; and the stay bolt supports, at different distances from its two ends, said nut-like collar and said collar nut, said stay bolt having a threaded section at one of said termini remote from the nut-like collar and extending close to the nut-like collar, the threaded section carrying said collar nut to enable the extension to be clamped between the collar nut threaded onto said threaded section and the nut-like collar.

5. A fastening device according to claim 4, wherein the nuts which press the attachment ends against the extension have widths extending at least part way across flats of the attachment ends, the widths of the nuts being greater than widths of the nut-like collar and of the collar nut.

6. A fastening device according to claim 1, wherein an attachment end is formed with disk extension pads for resting on an extension.

7. A fastening device according to claim 1, wherein recesses are formed in the attachment ends, each recess being formed as a stepped coaxial widening to a central passage hole, which passage hole receives the bolt means.

8. A fastening device according to claim 7, wherein the recesses are formed in an attachment end on both sides of the passage hole.

* * * * *